Dec. 20, 1966  R. ZOGLMANN ETAL  3,292,518
DEVICE FOR PROCESSING PHOTOGRAPHIC SHEET MATERIAL
Filed Jan. 7, 1964  3 Sheets-Sheet 1

INVENTORS
RUDOLF ZOGLMANN
CORNELIS VAN EGMOND
BY
Dean, Fairbank & Hirsch
ATTORNEYS Dec. 20, 1966   R. ZOGLMANN ETAL   3,292,518
DEVICE FOR PROCESSING PHOTOGRAPHIC SHEET MATERIAL
Filed Jan. 7, 1964   3 Sheets-Sheet 3

INVENTORS
RUDOLF ZOGLMANN
CORNELIS VAN EGMOND
BY
Dean, Fairbank & Hirsch
ATTORNEYS 3,292,518
DEVICE FOR PROCESSING PHOTOGRAPHIC SHEET MATERIAL
Rudolf Zoglmann, Delft, and Cornelis Van Egmond, Leiderdorp, Netherlands, assignors to N.V. Optische Industrie "De Oude Delft," Delft, Netherlands
Filed Jan. 7, 1964, Ser. No. 336,252
Claims priority, application Netherlands, Jan. 10, 1963, 287,657/63
7 Claims. (Cl. 95—94)

The invention relates to devices for the processing of photographic sheet material, such as exposed cut films or paper prints, and more particularly to devices of the type in which the photographic sheets are automatically conveyed in horizontal direction through a tank which contains a processing liquid, such as a developing or fixing liquid.

Fully or partly automatic processing machines for cut films, in which the films are transported successively through a series of processing baths, a drying chamber, etc., are well known and have been in use in the art for a long time. The practical value of such machines depends mainly on the reliability of the mechanisms used for conveying the films. According to a well-known system the films are placed in individual holders. These holders are carried on endless conveyors placed over the tanks in such a manner that the films while dragging through the tank are held submerged in the liquid. Between successive tanks transfer mechanisms for the film holders are mounted which lift the holders from one tank and lower them into the next. Systems of this type are generally complicated and susceptible to failure due to stalling of film holders at any point in the conveying system or the disattachment of films from the holders. The insertion of the films into and their removal from the film holders is usually cumbersome and not well suited for automation. These machines, moreover, generally require much space for a given capacity. A more recently developed well-known type of processing machine for sheet material uses a large number of slightly spaced cylindrical rollers mounted in an elongated frame which is placed in the processing tanks and defining a track for the sheets to be developed. The transfer from one bath to the next is done by further rollers so placed over the tanks as to form semi-circular paths for the film sheets. This system is much more reliable in practical use than the system using film holders. However, the necessary driving and bearing means for the many rollers tend to complicate the construction and to make the device expensive. Moreover, since the films sheets are moved substantially in their own plane instead of in a direction perpendicular thereto, the roller tracks must be relatively long and the capacity of the machine with given dimensions will be relatively limited. In addition, it is difficult to devise a machine of this type which is suitable for small sheet formats too.

It is, accordingly, an object of this invention to provide a novel device for the processing of photographic sheet material in which the horizontal conveying means for the sheets is of very simple and economic construction and is reliable in operation. It is a further object of the invention to provide such a device having a large processing capacity with moderate dimensions. A still further object is the provision of simple and reliable mechanisms to pass the sheets from one tank to the next.

In its broadest aspect, the device according to the present invention is characterized in that the horizontal conveying means comprises a helical conveyor wound of a thin strand and adapted to receive photographic sheets between its turns, said helical conveyor being rotatably supported at at least one of its ends, guiding means being provided near the lower side of said coil on which the lower edge of the photographic sheets will slide during conveying, and further guiding means parallel to the conveyor axis being positioned on either lateral side of the conveyor on a mutual distance slightly longer than the width of the photographic sheets so as to guide the photographic sheets laterally during conveying.

In devices constructed in accordance with the present invention it is desirable to prevent a too intensive contact between the emulsion side of the photographic sheets and the turns of the helical conveyor. For example, it has been noted when developing exposed cut films that there is a certain risk for the emulsion to be developed unevenly due to the more intensive replenishment of the developing agent at the places where the contact occurs. According to the invention, in such cases it can be ensured advantageously that the photographic sheets take a prescribed position in the helical conveyor in that means are provided to cause a liquid flow in the tank having a significant component in the direction of the conveyor axis. By such a flow the sheets can be forced to contact that turn of the helical conveyor which, in the direction of the flow, is behind the sheet. Evidently, the direction of flow can be the same as or reverse to the direction of conveyance.

In order to facilitate the removal of the photographic sheets at the end of the tank, means may be provided at the discharge end of the helical coil to lift the sheets a certain distance automatically, so that they may emerge from the bath and can be taken up by other conveying means for further treatment. Such lifting means can consist of a notch which is arranged for rotation together with the helical conveyor near the discharge end thereof in such manner that it engages the lower edge of a photographic sheet approaching the discharge end and forces this sheet upwards during further rotation of the conveyor. According to a preferred embodiment of the invention, the same action can be achieved by providing the last section of the helical conveyor at the discharge end thereof with a gradually diminishing winding radius whereby the photographic sheet when entering said section is lifted from the horizontal guiding it was sliding upon during horizontal conveyance.

Usually, photographic sheets must be treated in a succession of baths in order to obtain a clear and durable image and it is advantageous to provide automatically operating means to transfer the sheets from one processing tank to the next in succession. Vertical endless conveyors as are conventional for this purpose in machines working with film holders, are unsuitable for use in the device described herein. Roller tracks which pass the sheets through an arc of 180° across the partition separating the two processing baths may be objected to in that they cause a turn-over of the sheets relative to the direction of travel. In accordance with the present invention, a simple yet reliable solution of this problem may be devised which consists in providing a pair of cooperating rollers over the discharge end of one tank and another pair over the loading end of the next tank. All rollers have mutually parallel axes and are supported crosswise to the helical conveyor axis. The rollers of each pair turn in opposite directions such that a sheet emerging from the first bath and inserted between the first pair of rollers is drawn upwards and, after being passed on to the second pair of rollers, is lowered into the next tank. Above the plane of the rollers guiding means are provided to hold the sheet substantially vertical during the interval that it is effectively free from either pair of rollers, as well as means to pass the lower edge of the sheet across the partition between the baths in the direction of conveyance until the lower edge is over the second pair of rollers.

These and other features and objects of the invention will be described in greater detail with reference to the drawings which show a preferred embodiment of the invention in diagrammatic form.

Figure 1:
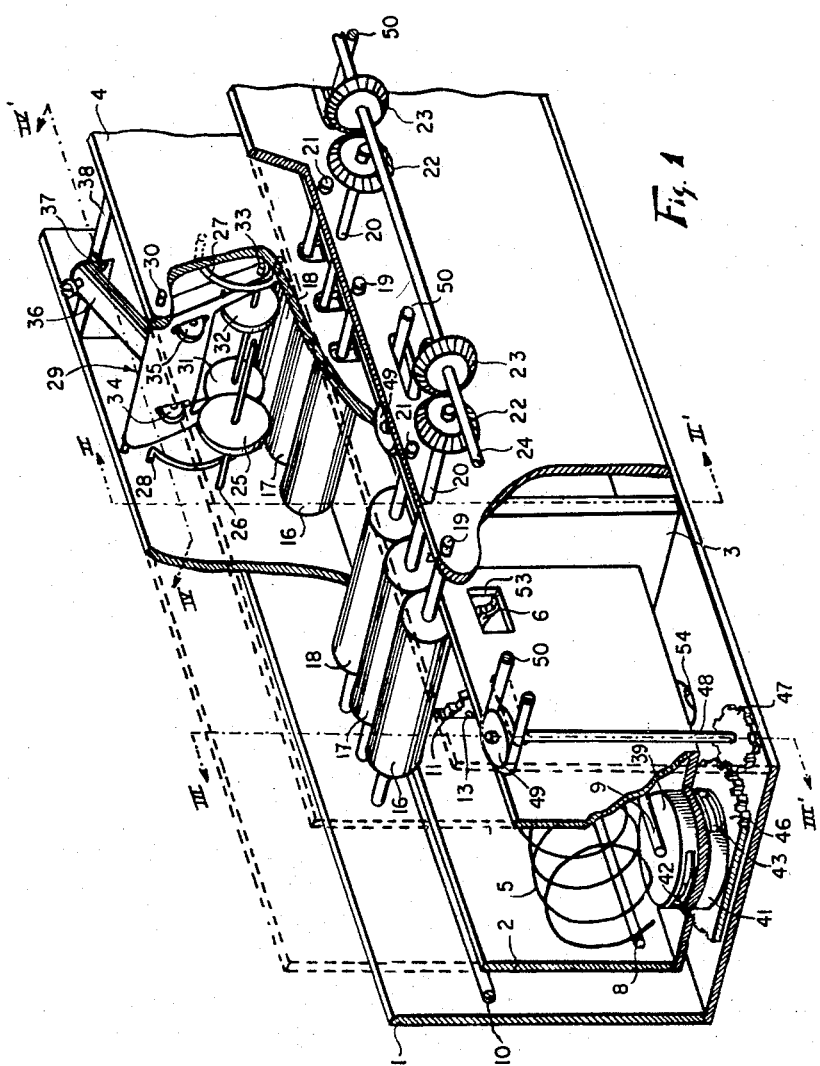
FIG. 1 is a perspective view of a portion of a processing machine for photographic cut films, several parts being broken away to show the interior.

The device illustrated comprises an outer trough 1 in which an inner trough 2 is placed. By vertical partitions 3 the troughs 1 and 2 are divided into compartments in which the cut films are subjected successively to various wet treatments such as developing, fixing and washing. The side-walls of the inner trough 2 carry a detachable structure 4 including two parallel side plates which are connected to each other by partitions such as 38 and which extend throughout the length of the machine. If the machine should be installed outside the dark room it can be provided with a detachable light-tight cover (not shown).

In the processing baths formed in the inner trough 2 the cut films are conveyed in horizontal direction by means of a helically wound strand 5 of e.g. inoxidizable steel wire. This element which hereinafter will be termed helical conveyor is supported at its two ends on circular discs 6 and 7 (see FIGS. 2 and 3). As clearly visible in FIG. 4, these discs are pivotally supported by cylindrical extensions of partitions 3. The cut films, such as 14 in FIG. 4, are standing upright between the turns of the helical conveyor 5 and are moved along when the conveyor is being rotated, while the lower edge of the films slide on a pair of horizontal guiding rods 8 and 9.

The rotation of the helical conveyor is derived from a shaft 10 which is driven by a conventional electric motor (not shown). To this end the disc 6 has a circumferential toothing engaging an intermediate gear 11 on a shaft 13 bearing on the partition 3. Gear 11 is driven by a gear 12 on the shaft 10.

Figure 2:
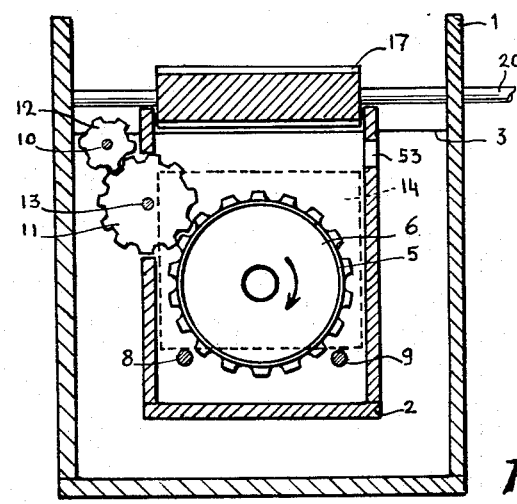
FIG. 2 is a cross-sectional view of the device shown in FIG. 1 along a plane perpendicular to the direction of horizontal conveyance and just in front of the partition 3 (see line II—II in FIG. 1)
Figure 3:
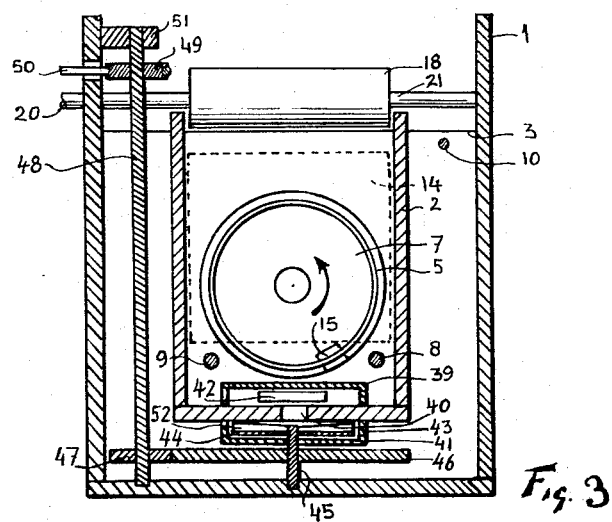
FIG. 3 is a cross-sectional view along a plane perpendicular to the conveying direction and passing through the shaft 48 (see line III—III in FIG. 1.
Figure 4:
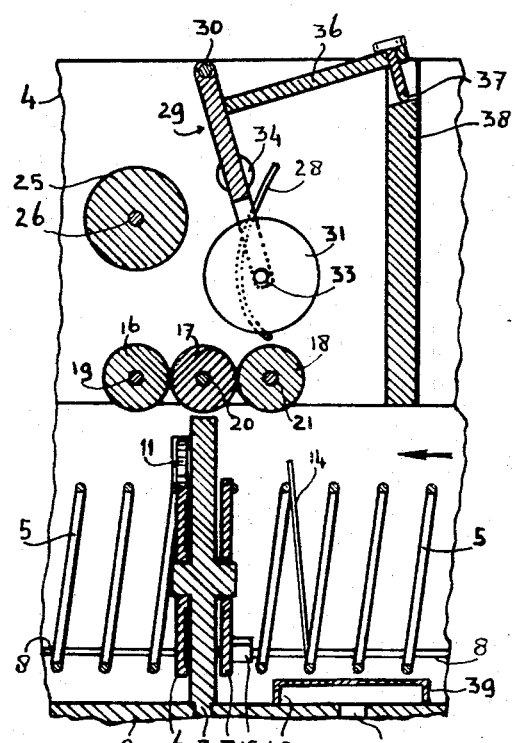
FIG. 4 is a cross-sectional view of a portion of the device of FIG. 1 along a plane parallel to the conveying direction and containing the axis of the helical conveyor 5 (see line IV—IV in FIG. 1)

In FIGS. 2 and 3 a film 14 in the helical conveyor 5 is indicated in dotted lines. FIG. 4 also shows one film 14, the direction of conveyance being indicated therein by an arrow.

In order to raise the film automatically after it has traversed the bath the disc 7 at the discharge end carries a projection 15 rotatable therewith. When the film enters the last turn of the helical conveyor its lower edge is engaged by projection 15 and pushed upwards, as illustrated in FIG. 3. The side-walls of the inner trough 2 which have held the film centered throughout its horizontal movement, now prevent the film from being tilted during the upward motion.

Figure 5:
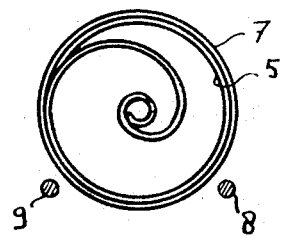
FIG. 5 is a view of a detail of a conveyor element in accordance with the invention.

A preferred alternative means for raising the film from the bath is shown in FIG. 5. In this case the last turn or turns of the helical conveyor, instead of being wound in a cylindrical surface like the remainder of the conveyor, is wound spirally such that the lower edge of the film will be engaged and lifted from the guidings 8 and 9, when the film enters these last turns.

In the device shown the transfer of the films from one bath to the next in succession is fully automatic. To this end the films, after having been raised a short distance from the bath in the manner described, are taken up by a pair of rotating rollers. Having passed these rollers the films, while being held substantially vertical, are displaced a short distance in the conveying direction and then are taken up by a further pair of rotating rollers which lower them into the next bath. In the preferred embodiment illustrated over each partition 3 only three rollers 16, 17 and 18 are mounted on parallel shafts 19, 20 and 21 supported by the side-walls of trough 1. Shaft 20 of roller 17 is extended and coupled to a driving shaft 24 by a pair of conical gears 22, 23. Shaft 24 as well as shaft 10 referred to hereinbefore extend along the various baths and are preferably driven by the same motor though not necessarily at the same speed. Rollers 16, 17 and 18 are mounted in such relationship that the sole driven roller 17 will engage the two others by friction. In FIG. 4 roller 17 is supposed to turn counterclockwise.

Over the rollers 16, 17, 18 means are positioned for driving the film in the conveying direction after it has become completely free from the rollers 17 and 18. These means comprise a wheel 25 on a shaft 26 bearing on the side-walls of the structure 4, a pair of fixed guides 27 and 28 of metal wire, and a device 29 acting as a pendulum and which is pivotable about a shaft 30 also supported by the side-walls of structure 4. The pendulum 29 has two wheels 31 and 32 on a shaft 33 and a pair of smaller wheels 34 and 35. A weight 36 forming another arm of the pendulum 29 bears in the position of rest with an adjustable stop 37 upon the beveled edge of the vertical partition 38.

In order to generate in each compartment of the inner trough 2 a forceful flow of the processing liquid, such compartments are provided with a small centrifugal pump sucking off the liquid at one end of the compartment and pressing it into the outer trough 1. A circular cap 39 is arranged on the bottom of the inner trough 2 which covers an opening 40 therein and has a circumferential inlet slot 42 on the side facing the disc 7. A pump housing 41 is suspended from the bottom of trough 2 and centered with the box 39. It has a lateral exhaust aperture 43. The rotor disc 44 has arcuate radial blades and is mounted on a shaft 45 carrying a gear 46 which engages a gear 47 on driving shaft 48. This shaft is supported by the bottom of trough 1 and a bearing 51 (FIG. 3) and is driven by a rope 50 through rope pulley 49. The driving power for all pumps can be produced by the same motor which also drives the shafts 10 and 24. The liquid flows back to the inner trough 2 through an opening 53 in the side-wall of the trough. Since this opening is situated near the end of the compartment away from the pump inlet slot 42 the liquid flow in the compartment 2 will be directed mainly parallel to the axis of the helical conveyor. In the embodiment shown this flow is in the same direction as the conveying motion, but it will be evident that this is not necessarily the case. Through an opening 54 in the bottom of the outer trough 1 the bath can be connected to a bottle (not shown) containing a supply of processing liquid.

The operation of the machine is as follows. The films to be processed are inserted one by one into the first turn of the continuously rotating helical conveyor of the first bath, usually the developing bath. This can be performed by hand as well as by some fully or semi-automatic means. In the case of automatic loading preferably a light-tight cassette may be used which can be detachably mounted on the machine and which contains a stack of exposed films. By the aid of a suitable mechanism the films can be separated from the stack one by one and lowered into the helical conveyor of the first bath. Film cassettes and separators of this general type are well-known in the art per se and do not form part of the present invention.

In the case of the device described so far it has been assumed that the films are placed in the helical conveyor with their emulsion side facing backward relative to the direction of conveyance. In view of the risk of uneven development discussed above, it is therefore desirable to ensure that the films 14 take the position shown in FIG. 4 wherein they are leaning with their base against the preceeding turn of the helical conveyor. This is achieved by a forced circulation of the processing liquid such that it flows essentially in the direction of conveying in the inner trough 2. Circulation is generated by pump 41 sucking the liquid at the discharge end of the compartment through slot 42 into the outer trough 1. The pump pressure raises the liquid level in the outer trough such that the liquid, after having traversed the trough in the reverse direction, reenters the inner trough 2 through the overflow aperture 53.

When the film 14 enters the last turn of the helical conveyor 5 it is raised by notch 15 on disc 7 and inserted between rollers 17 and 18. During this upward motion of the film its upper edge contacts the guiding wheels 31 and 32 on the pendulum 29 which is in rest. Due to the rigidity of the film the pendulum is forced to turn anticlockwise through a small angle, which deflection is limited by the fixed guides 27 and 28. The pendulum 29 by its wheels 31, 32 now exerts on the film a horizontal force which pushes the lower part of the film upon its leaving the rollers 17 and 18 to the left across the roller 17 (see FIG. 4). The counter wheel 25 ensures that the film maintains a nearly vertical position during this movement such that it can be taken up for lowering by the rollers 16 and 17. Upon passage between these latter rollers the film falls down into the first turn of the next helical conveyor 5. The small wheels 34, 35 ensure that the films at all times remain free from the plate in which they are mounted. However, if desired these wheels may be omitted without difficulty. It will be evident that the pendulum arm 36 could be replaced by a suitable stop means arranged in front of the pendulum, a draw-spring then taking the place of the weight of arm 36 for driving the pendulum back to its position of rest.

During transfer of the films from one bath to the next they are passed between pairs of rollers 17, 18 exerting a certain pressure on the films. This results in a nearly complete removal of adhering processing liquid from the films before these enter the next bath. Pollution of the baths is therefore eliminated to a large extent, whereas the provision of washing baths between e.g. the developer and the fixer becomes superfluous.

After having traversed all wet baths the film may be passed through an adjacent drying tunnel (not shown) in which it is exposed to a stream of hot air. Any suitable conveying means such as a roller track can be used for this purpose.

In the embodiment described all helical conveyors are supposed to be of the same shape and to have the same rotational speed. In that case the number of turns of each conveyor must be chosen so that with the selected speed of rotation the required staying time of the film in each of the processing baths is obtained.

The delivery of the finished films by the machine can be ensured in the same manner as the transfer from one compartment to the next. Below the rollers 16 and 17 e.g. a take-up box for the finished films can be mounted.

Various modifications can of course be applied to the embodiment shown and described without departing from the spirit and scope of the invention as defined in the appended claims. Particularly, it will be noted that the intermediate roller 17 may have at least at its ends a suitable profile so as to ensure that the lower edge of the film will have a sufficient grip thereon. The pendulum 29 could then be omitted, if desired. Instead of this pendulum a small blowing pipe mounted over the roller 18 and connected to a compressor could be used as a means to pass the films across the roller 17.

In connection with the helical conveyor it is observed that in certain cases it may be convenient to form this element of a flat strip which is wound in such a manner that the long sides of the strip are parallel to the conveyor axis. In this way the photographic sheets in successive turns of the conveyor will be spaced a larger distance from each other than if circular wire were used. Such greater spacing may be advantageous if sheets are to be processed which are not fully plane and have a tendency to stick to each other. In a simple manner any desired separation between the films can also be ensured with a conveyor would of circular wire if between each two sheets one or more turns of the conveyor are left empty.

What we claim is:

1. A device for processing of photographic sheet material comprising a tank, means for automatically conveying the photographic sheets in horizontal direction through said tank, said means comprising a helical conveyor wound of a thin strand and adapted to receive photographic sheets between its turns, means rotatably supporting said helical conveyor at at least one of its ends, guiding means near the lower side of the conveyor on which the photographic sheet will slide during conveying, further guiding means substantially parallel to the conveyor axis, positioned on either lateral side of the conveyor separated by a distance slightly longer than the width of the photographic sheets and effective to guide the photographic sheets laterally during conveying, and means to provide a liquid flow in said tank in the direction of advance of the conveyer and the photographic sheet carried thereby to cause said sheets to lean against the turn of the helical conveyer that is behind the sheet when viewed in the direction of flow whereby one surface of the sheet will be engaged by the helical turn.

2. A device for processing of photographic sheet material comprising a tank, means for automatically conveying the photographic sheets in horizontal direction through said tank, said means comprising a helical conveyer wound of a thin strand and adapted to receive photographic sheets between its turns, means rotatably supporting said helical conveyer at at least one of its ends, guiding means near the lower side of the conveyer on which the photographic sheet will slide during conveying, further guiding means substantially parallel to the conveyer axis, positioned on either lateral side of the conveyer separated by a distance slightly longer than the width of the photographic sheets and effective to guide the photographic sheets laterally during conveying, said helical conveyer having a discharge end and means rotatable with the conveyer and disposed as to effectively engage the lower edge of a photographic sheet approaching the discharge end of said conveyor to lift said sheet from the lower guiding means.

3. A device as claimed in claim 2, in which the end portion of the helical conveyer at the discharge end thereof has a gradually decreasing diameter to define said lifting means whereby said photographic sheets entering said end portion are raised from the lower guiding means.

4. The combination set forth in claim 2 in which the means to lift said sheet comprises an abutment carried by the helical conveyer near its discharge end and adapted to engage the lower edge of said sheet to lift the latter.

5. A device for the processing of photographic sheet material comprising a tank having at least two separate longitudinally aligned compartments, means for automatically conveying the photographic sheet in horizontal direction through the compartments of said tank in succession, said conveyer means comprising a helical conveyer wound of a thin strand and adapted to receive photographic sheets between its turns, means rotatably supporting said helical conveyer at at least one of its ends in each compartment, guiding means near the lower side of the conveyer on which the photographic sheet will slide during conveying, further guiding means substantially parallel to the conveyer axis, positioned on either lateral side of the conveyer separated by a distance slightly longer than the width of the photographic sheet and effective to guide the photographic sheet laterally during conveying, one of said compartments having a discharge end, a first pair of cooperating rollers disposed over the discharge end of said compartment crosswise to the axis of the helical conveyer, said rollers being rotatable in opposite directions so as to draw the sheets from said compartment upwards, the other compartment having a loading end adjacent the discharge end of the first compartment, a second pair of rollers disposed over the loading end of said other compartment, said second pair of rollers having their axes parallel to the axes of the rollers of said first pair and being rotatable in opposite directions so as to lower the sheets into said other compartment, means disposed above the plane of said first and second pairs of rollers to maintain the sheets in substantially vertical position during the interval that they are effectively free from either pair of rollers, and means to pass the lower edge of the sheets in the conveying direction across the separation between the compartments until the lower edge is over said second pair of rollers.

6. A device as claimed in claim 5, characterized in that said two pairs of rollers have one roller in common.

7. A device as claimed in claim 5 in which the means to pass the lower edge of the sheets from the first to the second pair of rollers comprises an element having force exerting means reacting thereagainst and disposed in the path of the sheets as they are raised by the first pair of rollers so as to be displaced thereby against the force exerted by said force exerting means, said element being driven back to its position of rest by said force exerting means after the sheets have passed the first pair of rollers, thereby moving said sheets towards said second pair of rollers.

References Cited by the Examiner

UNITED STATES PATENTS

| 1,741,981 | 12/1929 | Dewey et al. | 198—213 |
| 1,934,578 | 11/1933 | Williams | 95—89 |
| 2,362,587 | 11/1944 | Sardeson et al. | 95—89 |
| 2,795,702 | 6/1957 | Morris | 198—213 |
| 3,133,490 | 5/1964 | Buck | 95—96 |

NORTON ANSHER, *Primary Examiner.*

C. B. PRICE, *Assistant Examiner.*